US010137951B2

(12) United States Patent
Gray et al.

(10) Patent No.: US 10,137,951 B2
(45) Date of Patent: Nov. 27, 2018

(54) STEERABLE TRAILER

(71) Applicant: Salford Group Inc., Salford (CA)

(72) Inventors: Geof J. Gray, Burford (CA); John Mark Averink, Norwich (CA); Jacobus A. Rozendaal, Delhi (CA); Bradley William Baker, Stratford (CA); Chad Derek Pasma, Woodstock (CA)

(73) Assignee: Salford Group Inc., Salford (CA)

( * ) Notice: Subject to any disclaimer, the term of this patent is extended or adjusted under 35 U.S.C. 154(b) by 0 days.

(21) Appl. No.: 15/790,205

(22) Filed: Oct. 23, 2017

(65) Prior Publication Data
US 2018/0043954 A1 Feb. 15, 2018

Related U.S. Application Data

(62) Division of application No. 15/232,555, filed on Aug. 9, 2016, now Pat. No. 9,828,051.
(Continued)

(51) Int. Cl.
B62B 3/00 (2006.01)
B62D 63/06 (2006.01)
(Continued)

(52) U.S. Cl.
CPC ......... B62D 63/062 (2013.01); B62D 13/025 (2013.01); B62D 13/04 (2013.01); *A01C 7/208* (2013.01)

(58) Field of Classification Search
CPC .... B62D 63/062; B62D 63/06; B62D 63/061; B62D 13/04; B62D 13/025; B62D 13/00; B62D 13/02; A01C 7/208; A01C 7/20
See application file for complete search history.

(56) References Cited

U.S. PATENT DOCUMENTS 2,806,710 A * 9/1957 Mascaro ............... B60D 1/465
172/328
3,876,240 A * 4/1975 Watson ................. B62D 13/04
280/103
(Continued)

FOREIGN PATENT DOCUMENTS

DE 10053999 A1 5/2002
DE 102006008071 A1 9/2007
GB 2200603 A 8/1988

OTHER PUBLICATIONS

Aulari Model ALR2103AM product brochure.
(Continued)

*Primary Examiner* — James M Dolak
(74) *Attorney, Agent, or Firm* — Brunet & Co. Ltd.; Robert Brunet; Hans Koenig

(57) ABSTRACT

A trailer has a frame having frame-members configured to support a container, at least a pair of traction devices rotatably mounted on the frame, and a tongue configured to be mounted on a transportation device or an implement being towed by a transportation device. The frame-members may have a three-point mount configured to support a container. The container may be configured to be interchangeable with another container. The container may be an element of a seeding apparatus, the seeding apparatus mountable on the frame-members of the frame. The trailer may have a steering mechanism for the traction devices, and may be convertible between steerable and non-steerable modes. The steering mechanism may be guidance controlled. A transverse distance between the traction devices may be adjustable and/or height of the frame in relation to the ground may be adjustable. The trailer provides greater flexibility of operation under a greater variety of conditions.

11 Claims, 14 Drawing Sheets

Related U.S. Application Data

(60) Provisional application No. 62/203,160, filed on Aug. 10, 2015.

(51) Int. Cl.
*B62D 13/02* (2006.01)
*B62D 13/04* (2006.01)
*A01C 7/20* (2006.01)

(56) References Cited

U.S. PATENT DOCUMENTS

| | | | |
|---|---|---|---|
| 4,008,902 A * | 2/1977 | Dill | B60P 1/025 280/43.23 |
| 4,720,119 A * | 1/1988 | Ritter | B62D 13/04 280/419 |
| 5,244,226 A * | 9/1993 | Bergh | B62D 13/04 280/426 |
| 5,326,128 A * | 7/1994 | Cromley, Jr. | B60G 3/145 180/906 |
| 5,340,142 A | 8/1994 | Kuhns | |
| 5,364,116 A | 11/1994 | Houle et al. | |
| 5,382,041 A | 1/1995 | Keith | |
| 5,558,350 A | 9/1996 | Kimbrough et al. | |
| 5,772,230 A | 6/1998 | Kemnitz | |
| 5,873,592 A | 2/1999 | Daenens | |
| 6,131,691 A | 10/2000 | Morch | |
| 6,148,863 A | 11/2000 | Memory et al. | |
| 6,158,759 A * | 12/2000 | Perry | B62D 13/04 280/444 |
| 6,169,940 B1 | 1/2001 | Jitsukata et al. | |
| 6,186,244 B1 | 2/2001 | Friggstad | |
| 6,431,576 B1 | 8/2002 | Viaud et al. | |
| 6,450,523 B1 | 9/2002 | Masters et al. | |
| 6,494,476 B2 | 12/2002 | Masters et al. | |
| 6,517,097 B1 | 2/2003 | Stark | |
| 6,533,061 B1 | 3/2003 | Fairless et al. | |
| 6,684,975 B2 | 2/2004 | Rudolph | |
| 6,692,014 B1 * | 2/2004 | Grosso | B60G 7/02 280/124.166 |
| 7,137,641 B1 * | 11/2006 | Lipsey, III | B62D 13/02 280/411.1 |
| 7,810,832 B2 | 10/2010 | Montag | |
| 7,874,570 B2 | 1/2011 | Montag | |
| 8,042,817 B2 * | 10/2011 | Motebennur | B60G 9/00 280/5.514 |
| 8,205,893 B2 * | 6/2012 | Peterson | B60B 35/001 280/6.157 |
| 8,955,853 B1 * | 2/2015 | Perkins | B60D 1/246 280/6.159 |
| 9,022,409 B2 | 5/2015 | Montag | |
| 9,428,027 B2 * | 8/2016 | Iliuta | B60P 1/027 |
| 9,828,051 B2 * | 11/2017 | Gray | B62D 63/062 |
| 9,840,277 B1 * | 12/2017 | Beech | B62D 13/02 |
| 2005/0077703 A1 * | 4/2005 | Tango | A01B 69/006 280/442 |
| 2010/0181743 A1 * | 7/2010 | Timmons, Jr. | B60D 1/173 280/442 |
| 2013/0079927 A1 | 3/2013 | Rahilly et al. | |
| 2013/0158863 A1 | 6/2013 | Skvarce et al. | |

OTHER PUBLICATIONS

Aulari Model ALR3002 product brochure.
Hinker 6000 Side-dress Applicator web site extract dated Jul. 23, 2015.
Office action dated Jun. 21, 2016 on U.S. Appl. No. 15/232,555.

* cited by examiner

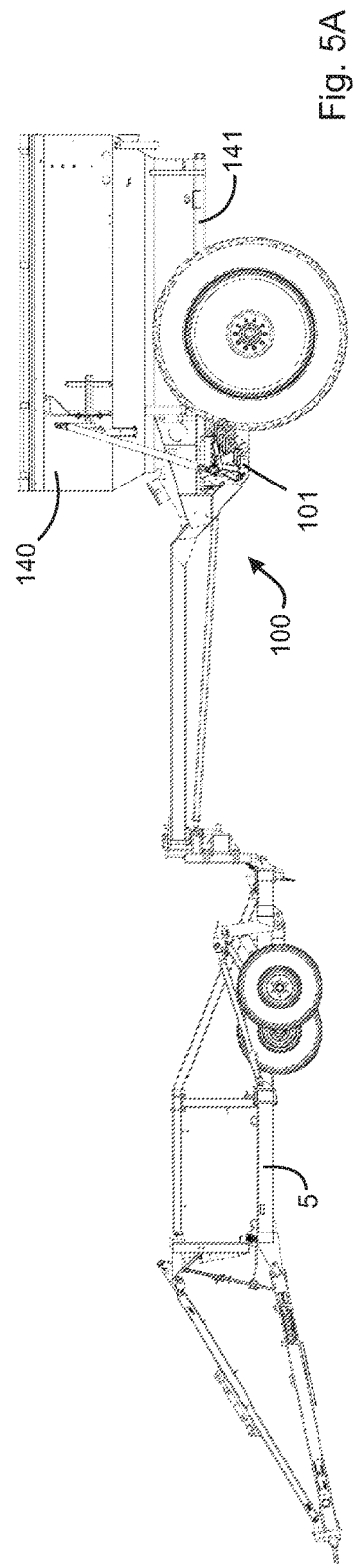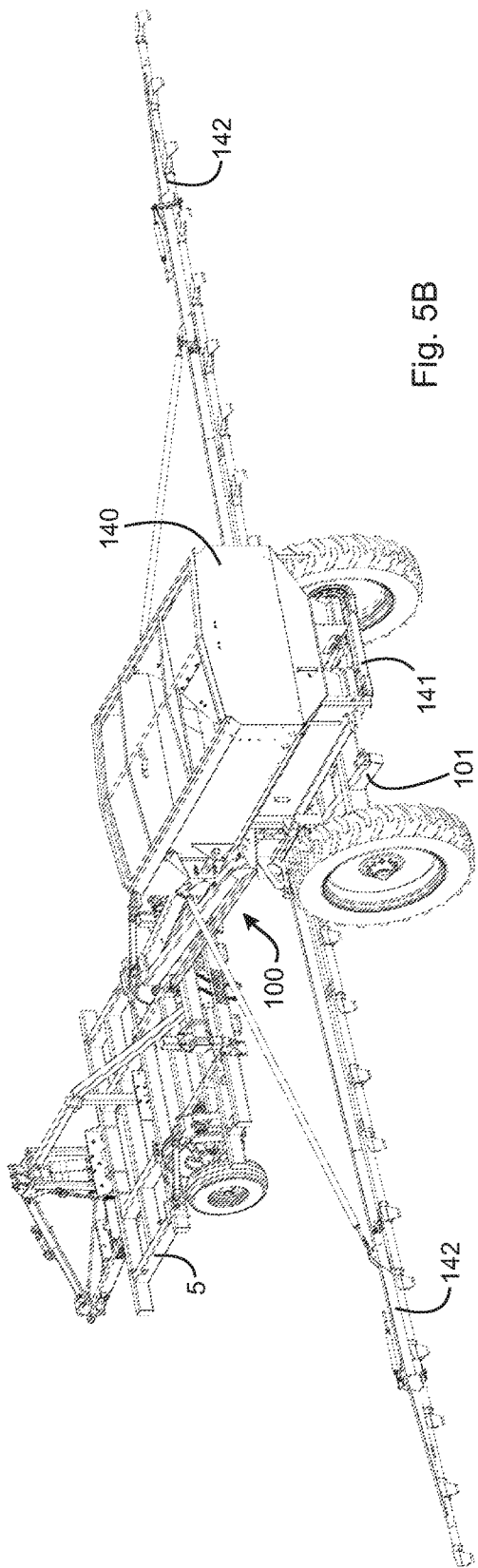

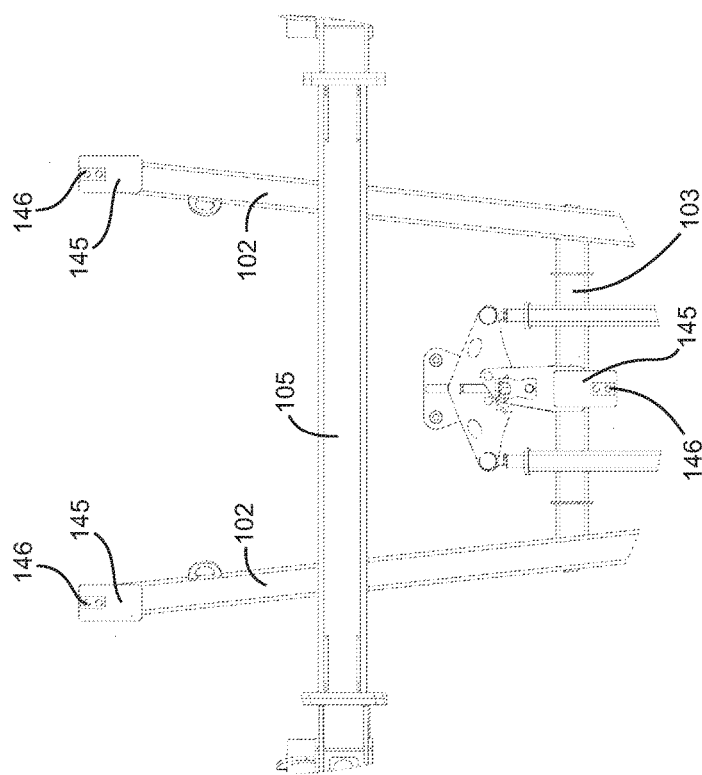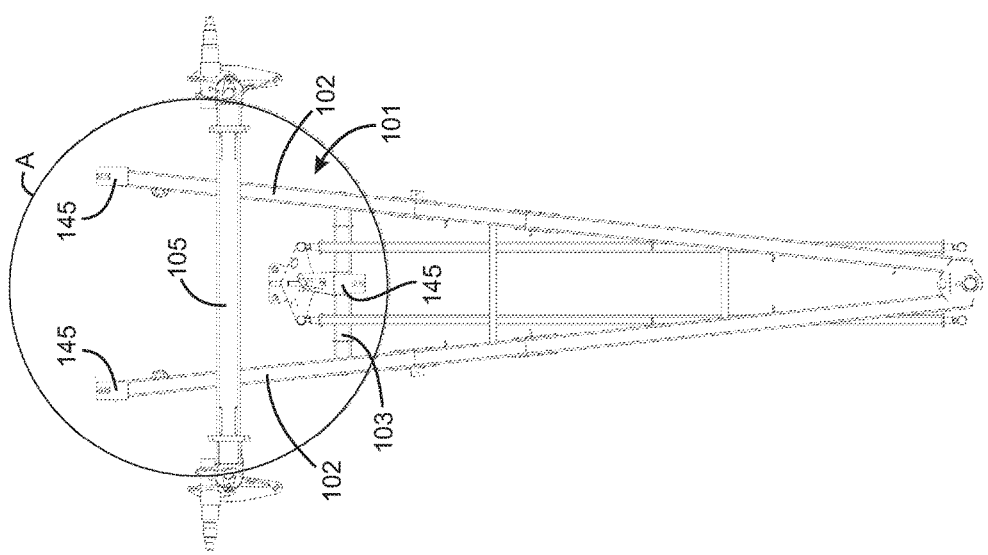

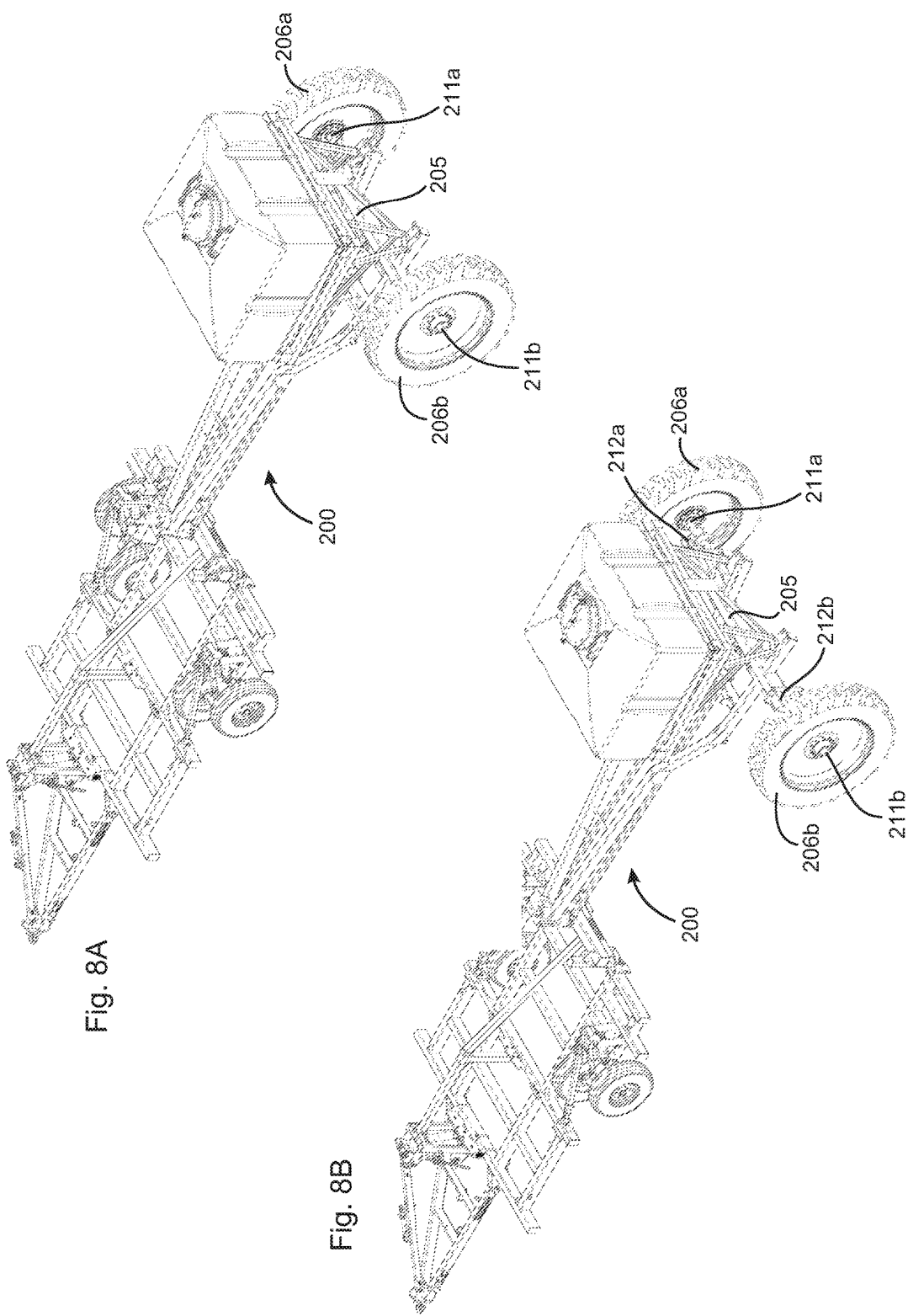

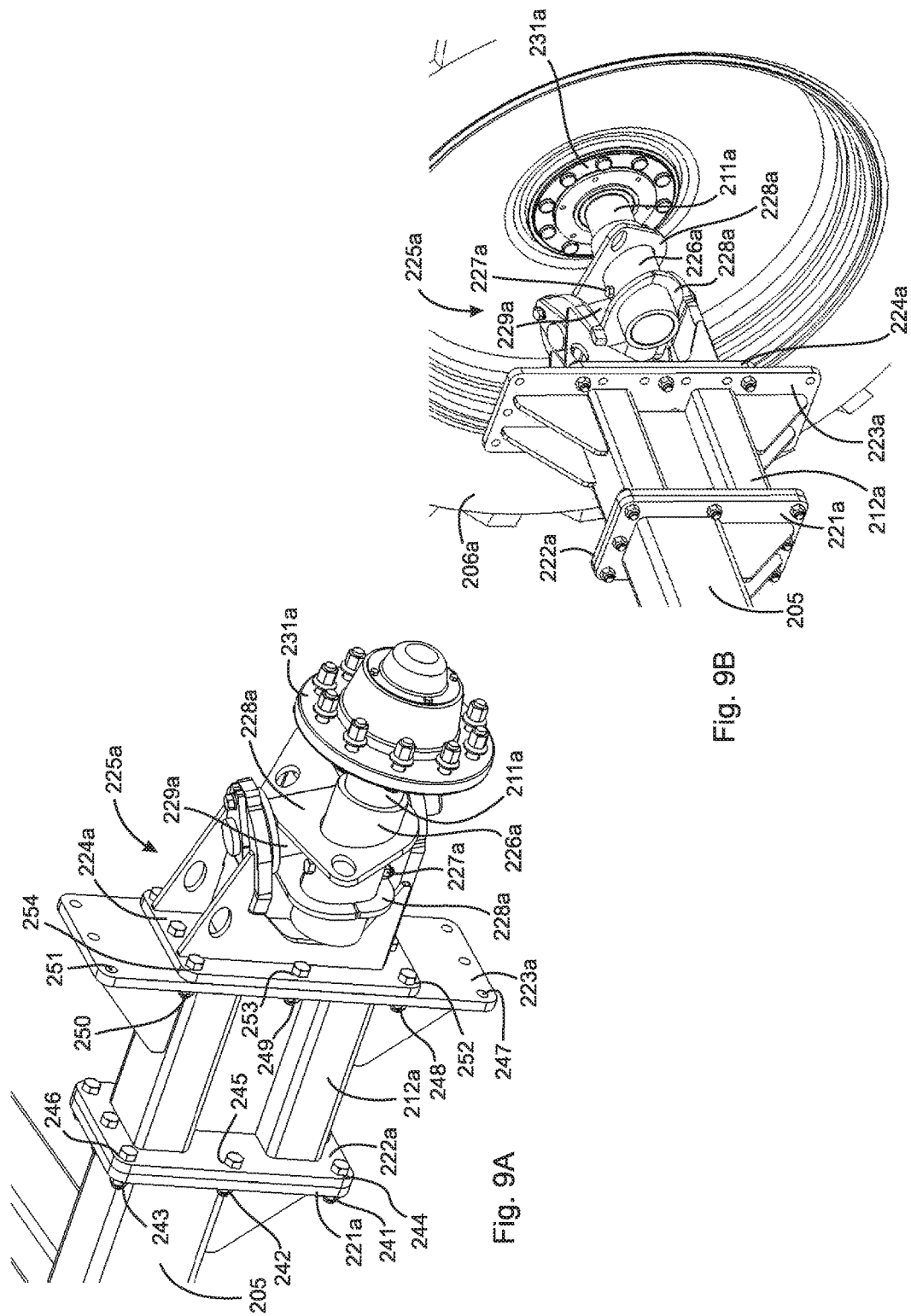

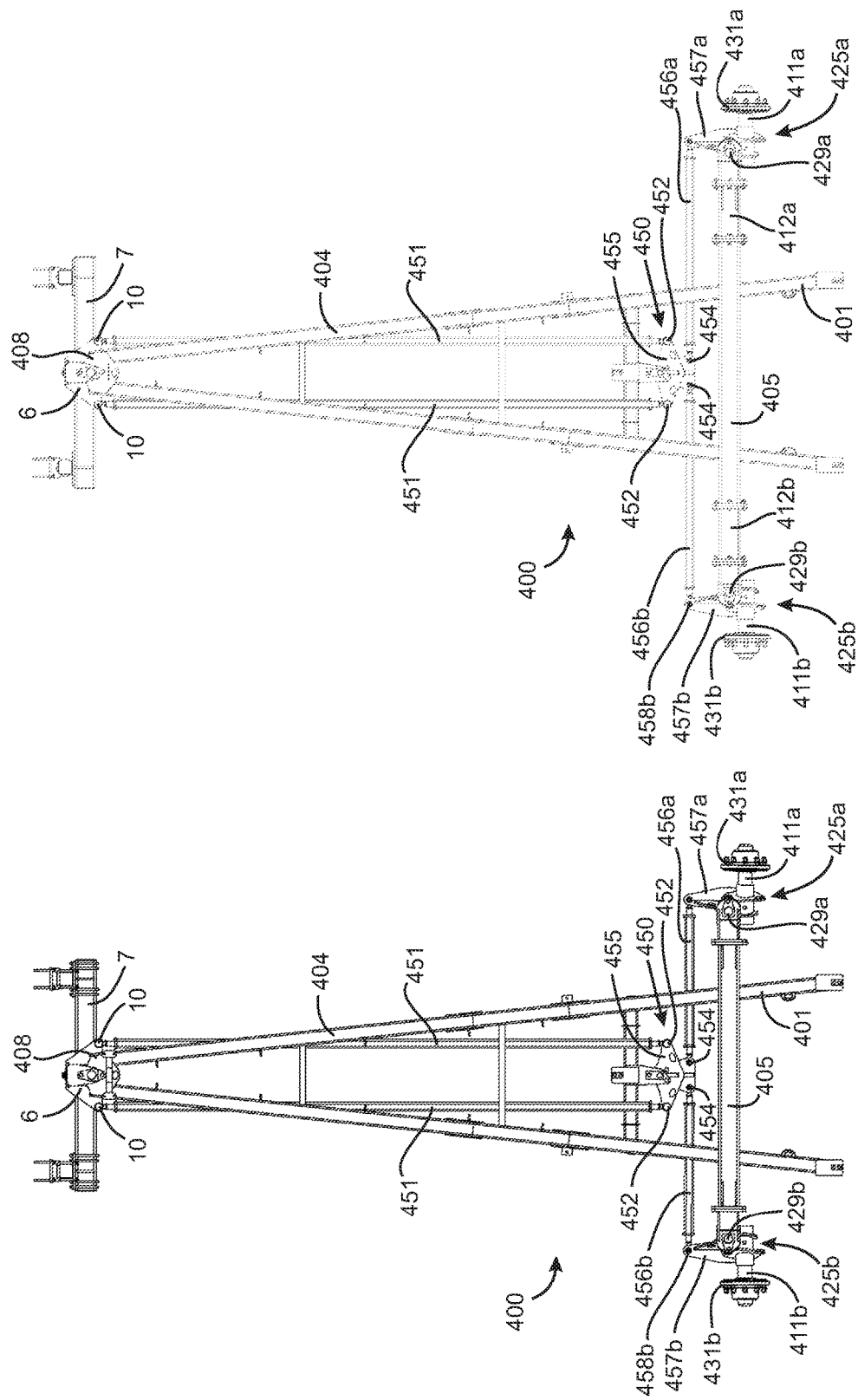

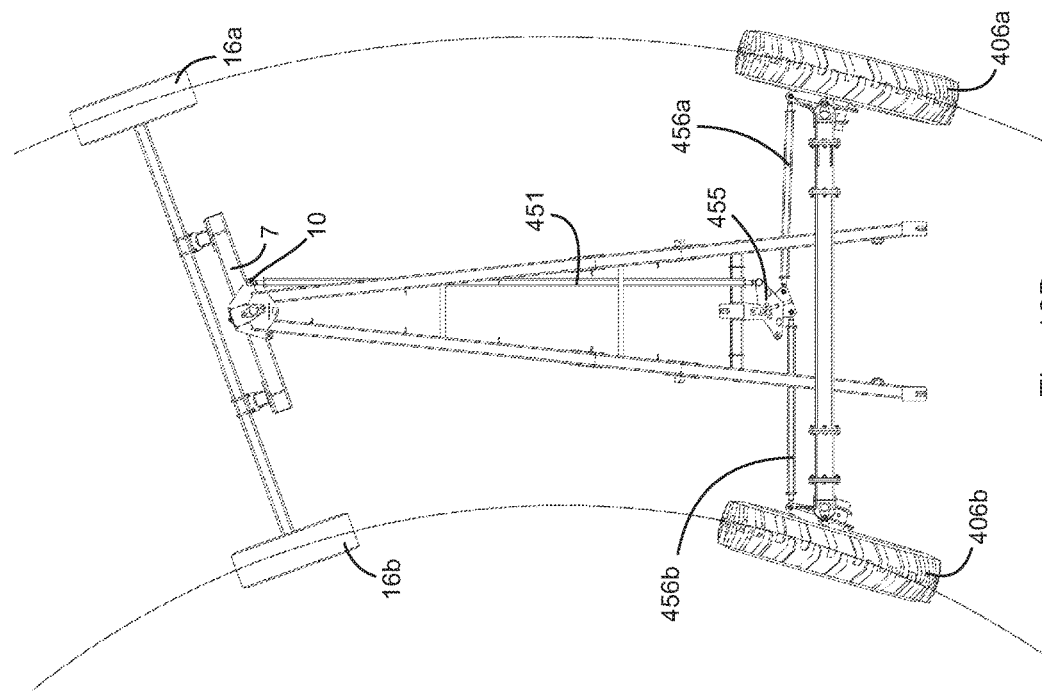
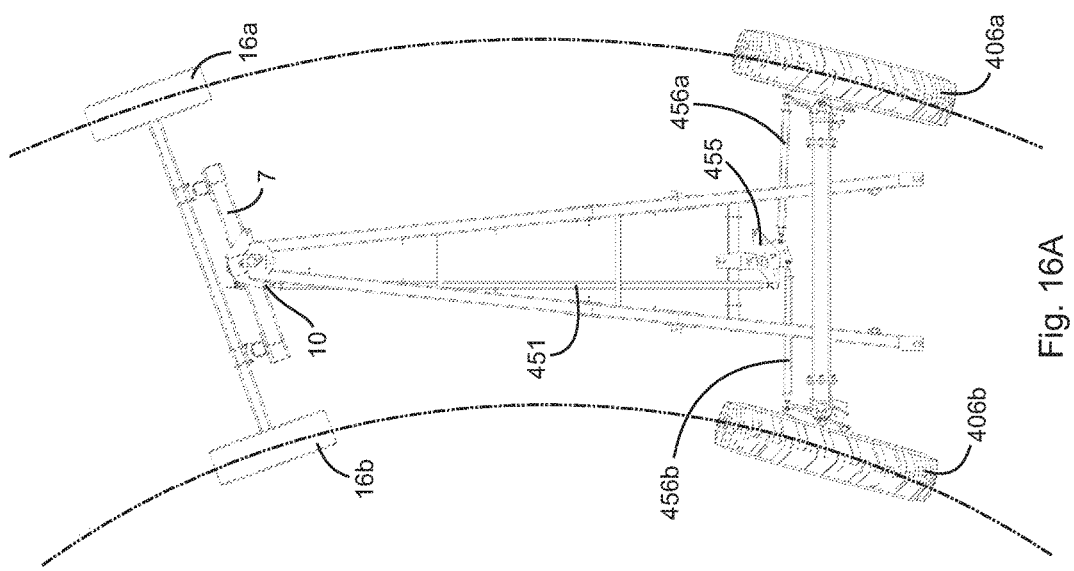

STEERABLE TRAILER

CROSS-REFERENCE TO RELATED APPLICATIONS

This application is a divisional application of U.S. patent application Ser. No. 15/232,555 filed Aug. 9, 2016, and claims the benefit of U.S. Patent Application 62/203,160 filed Aug. 10, 2015, the entire contents of both of which are hereby incorporated by reference.

Field

This application relates to trailers, in particular to trailers for towing behind an agricultural implement.

Background

Agricultural carts for transporting containers containing solid or liquid inputs are known in the industry. Such carts are typically designed for one type of application, lacking flexibility in the type of input to be carried or the conditions under which the input is to be distributed in a field. Carts with greater flexibility of operation are generally more desirable reducing the number of implements a farmer needs to purchase and reducing inventory that dealers may need to carry at any given time.

SUMMARY

There is provided a trailer comprising: a frame having frame-members configured to support a container; at least a pair of traction devices rotatably mounted on the frame; and, a tongue configured to be mounted on a transportation device or an implement being towed by a transportation device.

In one aspect, the frame-members may comprise a three-point mount configured to support a container.

In one aspect, the container may be configured to be interchangeable with another container.

In one aspect, the container may be an element of a seeding apparatus, the seeding apparatus mountable on the frame-members of the frame.

In one aspect, the trailer may comprise a steering mechanism for the traction devices.

In one aspect, the steering mechanism may be designed for row cropping applications.

In one aspect, the trailer may comprise a guidance control for a steering mechanism.

In one aspect, the trailer may be convertible between a steerable trailer and a non-steerable trailer.

In one aspect, a transverse distance between the traction devices in the pair of traction devices may be adjustable.

In one aspect, a height of the frame in relation to the ground may be adjustable.

The trailer comprises a frame. The frame has a longitudinal axis in the direction of motion of the trailer as it is being towed across the ground. The longitudinal axis runs from front to rear (or rear to front) of the frame. The frame has a transverse axis that is perpendicular to the longitudinal axis and runs left to right (or right to left) of the frame. The frame may have a plurality of connected frame-members, for example longitudinally and/or transversely spaced-apart frame-members, on which the traction devices, tongue, container and/or other elements may be mounted. The frame-members may comprise any suitably strong and/or rigid material (e.g. steel, aluminum alloy) in the form of elongated structures (e.g. tubes or bars). In one embodiment, frame-members may comprise rectangular tubes.

The trailer further comprises a tongue. The tongue may extend longitudinally forward of the frame and is configured to be mounted on a transportation device (e.g. a vehicle, for example a tractor) or an implement being towed by a transportation device. Such implements may include, for example, another trailer or any type of tillage or row cropping apparatus (e.g. a planter, a strip till bar, a fertilizer bar, etc.) The tongue may be a separate elongated structure rigidly mounted on the frame (for example by welding, bolting or the like) an integral extension of one or more of the frame-elements, or a combination thereof. The tongue comprises an attachment structure, preferably proximate or at a longitudinally forward end of the tongue, configured to mount the tongue on a corresponding attachment structure at a mounting point on the transportation device or implement. The attachment structure preferably provides for some degrees of freedom of motion at the mounting point. In a preferred embodiment, the tongue may comprise one or more ball hitches on pivoting knuckles.

Containers may be supported on the frame-members. The containers may be mounted at one or more points on the frame-members, for example two to five mounting points. The frame-members preferably comprise three mounting points, providing a good balance between secure mounting and easy interchangeability of containers. The mounts on the frame-members may comprise apertures through which pins on the containers may be fitted. The pins may be secured in the apertures by cotter pins, or in the case where the pins are bolts they may be secured in the apertures with nuts. Other types of mounts and securement devices may be utilized, for example pin and pocket, ridge and groove mounts and the like secured with clamps, spot welds and the like. Mounting containers on the frame may be aided by mounting guides to facilitate moving the container to the correct location on the frame for mounting. The mounts may further comprise weigh scales (e.g. load cells), preferably in electronic communication with a remote display device, computer or the like, to provide an indication of the weight of the container on the frame, which facilitates understanding the levels of product in the container at any given time. The frame-members may also comprise multiple sets of mounts for mounting more than one container.

Containers are preferably interchangeable on the frame to provide for a modular system. The containers may be directly and removably mounted on the frame or the containers may be mounted in a separate container retaining structure and the container retaining structure removably mounted on the frame. Container retaining structures may comprise, for example, interconnected struts configured to receive and secure the container within a network of the struts. It is an advantage of the present trailer that the containers may be a wide variety of types of containers, especially for agricultural product, and still be interchangeable on the same trailer. The containers may be for solid or liquid product, for example, bins, hoppers, boxes, tanks and the like. The product may be fertilizer, seed, anhydrous ammonia, pesticide, herbicide, lime or the like. The containers may be pressurized or non-pressurized. The containers may be accompanied by metering devices for metering product from the container into spreaders. Spreaders associated with the container may comprise liquid or solid product spreaders, for example liquid spray mechanisms, spinners for particulate materials or air delivery mechanisms (e.g. air lines and/or booms and the like) for particulate materials. In one embodiment, the container is a seed bin for cover seeding in association with other parts of a seeding apparatus, for example an air seeder. The trailer is particularly useful as an agricultural applicator cart.

The trailer further comprises at least a pair of traction devices rotatably mounted on the frame to permit movement of the trailer on the ground. The traction devices may comprise wheels, belts, tracks or the like and any combination thereof. Wheels are preferred. The traction devices are preferably located on either side of the frame. The traction devices may be mounted on one or more axles, the one or more axles mounted on the frame. One or more traction devices may be mounted on one axle on one side of the trailer. One traction device per axle per side of the trailer is common, but using two or more traction devices per axle per side may lower soil compaction and/or increase carrying capacity of the trailer. Preferably, the traction devices are mounted on stub axles and opposed stub axles mounted on an axle bar connecting the stub axles. The stub axles are preferably circular in cross-section so that the traction devices can readily rotate. The stub axles may comprise hubs onto which the traction devices, especially wheels, may be removably mounted. The axle bars may be of any cross-sectional shape and may be transversely in line or out of line with the stub axles when the traction devices are straight. The axle bars may be formed of one or more of the frame-members of the frame. The stub axles are preferably mounted on the axle bar such that the stub axles, traction devices and any mounting assembly for mounting the stub axles and traction devices on the axle bar may rotate thereby causing the trailer to turn. Such rotational motion assists with a steering mechanism as described below. Where the trailer comprises just two opposed traction devices, the container mounting points are preferably arranged on the frame-members so that the container's center of gravity is over the axle bar.

The trailer may be non-steerable or may comprise a steering mechanism for the traction devices. In one embodiment, a steering mechanism ensures that the traction devices stay between crop rows and track properly behind the transportation. Keeping the traction devices between crop rows is particularly important in row cropping applications. The steering mechanism may be entirely mechanical, or may further comprise hydraulic or electric actuators. In one embodiment, the steering mechanism is entirely mechanical comprising mechanical linkages.

Any suitable steering mechanism may be employed. For example, the traction devices on each side of the trailer may be steered by separate 4-bar linkage assemblies, where each 4-bar assembly comprises four linkages pivotally connected in a quadrilateral, and each 4-bar assembly is controlled by separate longitudinal control rods extending forward and connected to the transportation device or implement.

However, the steering mechanism preferably comprises a 5-bar linkage assembly in which five linkage arms are connected at pivot points so that the linkages may move relative to each other. In one embodiment, three of the five linkage arms are length adjustable. In one embodiment, two of the linkages comprise mounting assemblies for pivotally mounting the stub axles (and therefore the traction devices) on the axle bar. The stub axles on the mounting assemblies are able to pivot on the axle bar thereby turning the traction devices. One of the linkages comprises the axle bar, which is rigidly mounted on the frame or is a part of the frame. The other two linkages comprise tie rods, each tie rod pivotally mounted on respective mounting assemblies to permit pivoting of the mounting assemblies at the connection between the tie rods and the mounting assemblies. The tie rods may be pivotally connected at a pivot plate to form the 5-bar steering mechanism. The pivot plate may be pivotally connected to the transportation or an implement by one or more control rods, the one or more control rods pivotally connected to the pivot plate proximate first ends of the control rods and pivotally connected to the transportation or implement proximate second ends of the control rods. In such an arrangement, turning of the transportation or implement causes longitudinal movement of the one or more control rods, causing pivoting of the pivot plate. Pivoting of the pivot plate causes the tie rods to translate (e.g. by pushing one tie rod and pulling the other tie rod), causing the stub axles to pivot thereby turning the traction devices of the trailer in response to the turning of the transportation or implement.

The trailer may also be readily convertible between steerable and non-steerable modes by disabling the steering mechanism. In one embodiment, the 5-bar steering mechanism particularly facilitates the conversion by simply locking the pivot plate to prevent the pivot plate form turning. Locking the pivot plate may be accomplished, for example, with a pin-in-hole arrangement, a clamp arrangement or any other suitable arrangement. Disconnecting the one or more control rods from the pivot plate and/or the transportation or implement would further assist in the conversion from steerable to non-steerable mode. Where more than one control rod is used, disconnecting all of the control rods may be required. Unlocking the pivot plate and reconnecting the one or more control rods would return the trailer to steerable mode.

The trailer may also comprise guidance control of steering. Guidance control of steering may be accomplished in any suitable way, including methods known in the art. In one embodiment, a global navigation satellite system (GNSS), especially with real time kinematic (RTK) enhanced function, may be used. In one particular embodiment, a linear distance may be determined between a fixed point on the pivoting tongue of the trailer and a fixed point on the attachment structure of the transportation device or implement to which the tongue is attached. The linear distance may be correlated to the position of a global navigation satellite system (GNSS) receiver (e.g. a global positioning system (GPS) receiver) relative to a pre-mapped line of travel pre-programed into both an auto-steer functionality of the transportation device and a secondary guidance system for the trailer itself. A controlled actuator (e.g. a servo-controlled hydraulic cylinder) may override pivoting of the tongue to return the trailer to tracking along the pre-mapped line of travel. The controlled actuator may be activated by a guidance system controller. To implement guidance control in the steering mechanism, actuators (e.g. hydraulic cylinders and/or electric actuators) may be used instead of linkage arms in the steering mechanism and the action of the actuators controlled according to GNSS input to steer the trailer on the pre-mapped line of travel. Alternatively, mechanical linkage arms in the steering mechanism may be equipped with in-line linkage compensating actuators (e.g. electric linear actuators and/or hydraulic cylinders), which may be activated to partially or completely move the traction devices in response to GNSS input or, for side hill tracking, provide a correction amount to keep the trailer on the pre-mapped line of travel.

In a particularly preferred embodiment, transverse distance between the traction devices (e.g. wheel-to-wheel distance) may be adjustable in order to accommodate differing axle lengths of the transportation or implement, or to more generally ensure that the traction devices of the trailer ride between crop rows. Adjustment of the transverse distance may be accomplished mechanically or by using hydraulic or electric actuator arrangements. In one embodiment, an axle may comprise one or more disconnectable connection points into and out of which one or more spacers may be inserted or removed to lengthen or shorten the axle. Where the trailer comprises a steering mechanism, certain connections in the steering mechanism may need to be lengthened or shortened to accommodate the change in transverse distance. Where the steering mechanism comprises actuators, the stroke length can be readily adjusted to accommodate the change in transverse distance, whereas with mechanical elements of the steering mechanism, length adjustable rods may be used to accommodate the change in transverse distance. Further, pivoting points in the steering system, for example the pivot plate in the 5-bar mechanism described above, may need to translate longitudinally to accommodate the change in transverse distance.

It is a particular advantage of a 5-bar steering mechanism that the tie rods may be pivotally connected to a common pivot plate and that arrangements for adjusting the transverse distance may be located between the pivot point of each tie rod on the pivot plate and the pivot point of each tie rod on the stub axle mounting assemblies. Therefore, the lengths of the tie rods may be changed to accommodate the change in transverse distance without affecting the ability of the trailer wheels to correctly track behind traction devices of the transportation or implement during a turn.

In another particularly preferred embodiment, height of the trailer in relation to the ground may be adjustable. Height adjustment may be conveniently accomplished by mounting one or more axles, and therefore the traction devices, at different vertically-spaced locations on the frame or by using hydraulic or electric actuators (e.g. hydraulic cylinders or liner actuators) to move an axle vertically. In one embodiment, stub axles to which the traction devices are mounted may be configured for mounting at different vertically-spaced locations on mounting plates proximate each end of a transverse axle bar rigidly mounted on the frame. As with any changes in the transverse distance, where the trailer comprises a steering mechanism, certain connections in the steering mechanism may need to be lengthened or shortened to accommodate the change in height of the trailer in relation to the ground.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which:

FIG. 5A depicts a side view of the trailer depicted in FIG. 1A with a granular fertilizer bin mounted on the trailer.

FIG. 5B depicts is a rear perspective view of the trailer depicted in FIG. 5A further showing an air boom spreader for granular fertilizer in association with the granular fertilizer bin.

FIG. 6A depicts a plan view of a frame of a trailer.

FIG. 6B depicts a magnified view of a region A of the frame depicted in FIG. 6A.

FIG. 8A depicts a rear isometric view of a trailer having a pair of opposed wheels separated by a shorter transverse distance.

FIG. 8B depicts a rear isometric view of the trailer of FIG. 8A where the opposed wheels are separated by a longer transverse distance.

FIG. 9A depicts a magnified view of one embodiment for extending transverse distance between opposed wheels of the trailer of FIG. 8A to the arrangement depicted in FIG. 8B.

FIG. 9B depicts a reverse view of the embodiment depicted in FIG. 9A including a wheel mounted on a hub.

FIG. 12A depicts a plan view of a trailer having one embodiment of a steering mechanism for a pair of opposed wheels on the trailer.

FIG. 12B depicts the trailer of FIG. 12A where transverse distance between the opposed wheels has been increased.

FIG. 16A depicts a plan view of a trailer steerable with only one control rod.

FIG. 16B depicts a plan view of a trailer steerable with only one control rod and where transverse distance between the opposed wheels has been increased.

DETAILED DESCRIPTION

Figure 1A:
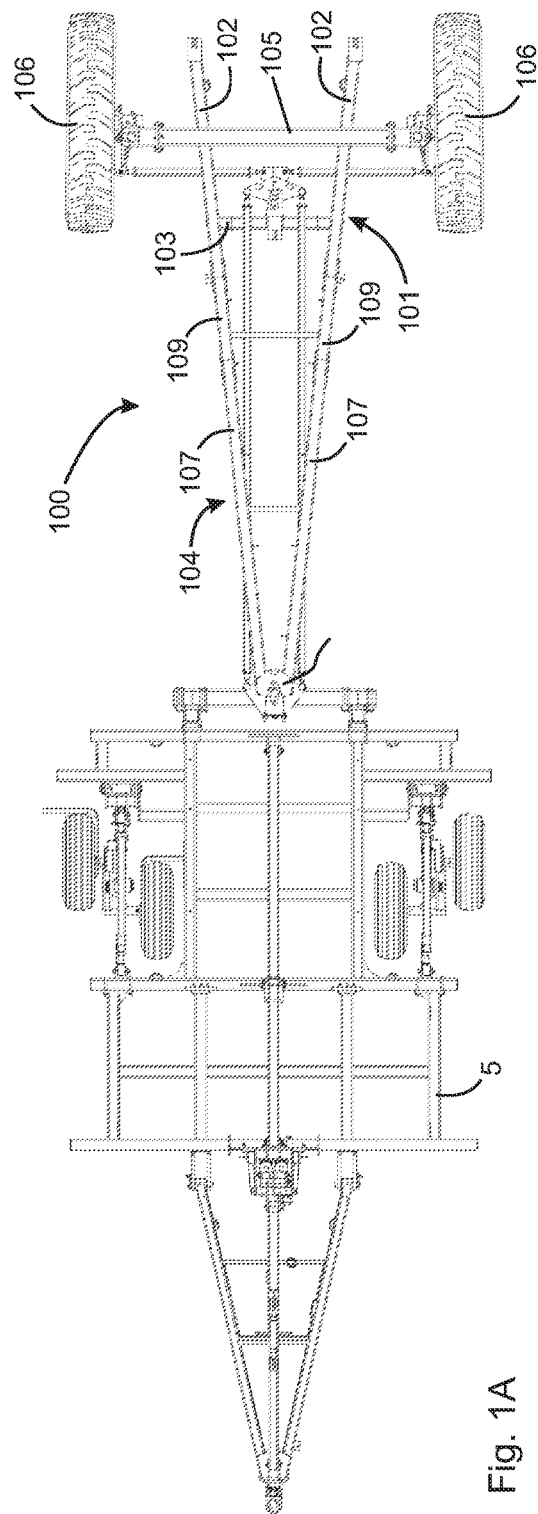
FIG. 1A depicts a plan view of a trailer being towed behind an agricultural implement.
Figure 1B:
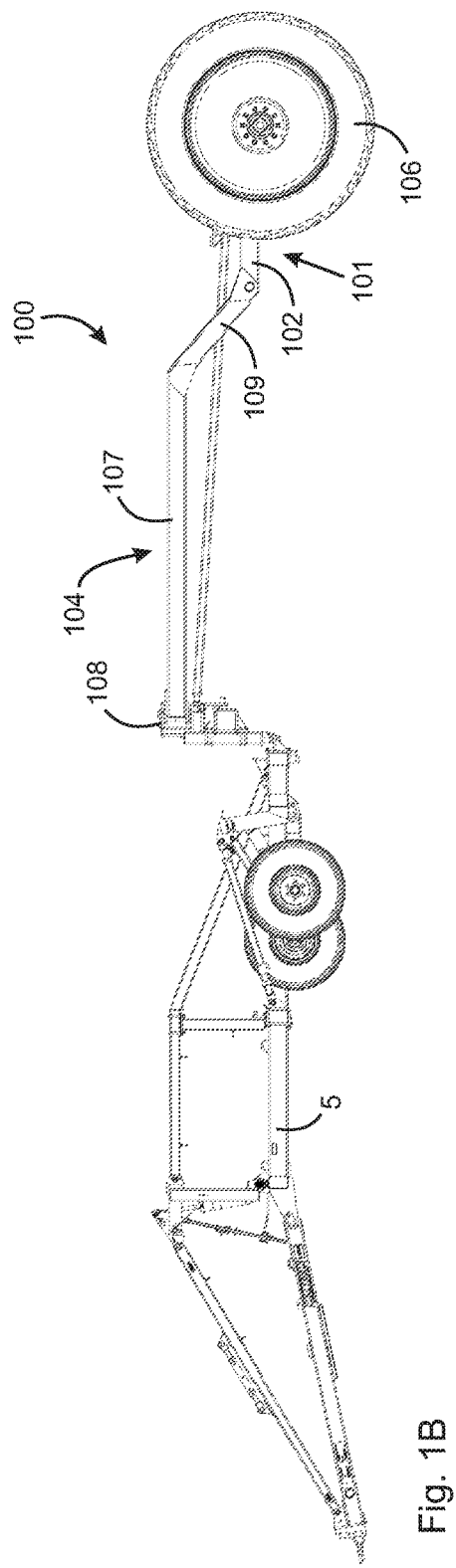
FIG. 1B depicts a side view of the trailer depicted in FIG. 1A.

Referring to FIG. 1A and FIG. 1B, a trailer 100 is depicted being towed behind an agricultural implement 5. The agricultural implement 5 is in turn being towed by a vehicle (not shown), for example a tractor. The trailer 100 comprises a frame 101 comprising longitudinally oriented rectangular tubes 102 and a transversely oriented rectangular tube 103 welded together to form a supporting structure for a container. The frame 101 further comprises an axle bar 105 welded to the longitudinally oriented rectangular tubes 102, the axle bar 105 also comprising a rectangular tube and providing additional structural support for the frame 101. A pair of opposed wheels 106 are rotatably mounted on the axle bar 105. A tongue 104 is formed from a pair of converging longitudinally oriented rectangular tubes 107 meeting at hitch 108. Each of the converging longitudinally oriented rectangular tubes 107 are rigidly connected (e.g. by welding, bolting or the like) to respective longitudinally oriented rectangular tubes 102 by angled braces 109. Hitch 108 comprises a pair of ball hitch receivers, one at the end of each tube 107, fitted with knurled knuckles to permit relative movement of the tongue 104 to the implement 5.

Figure 2:
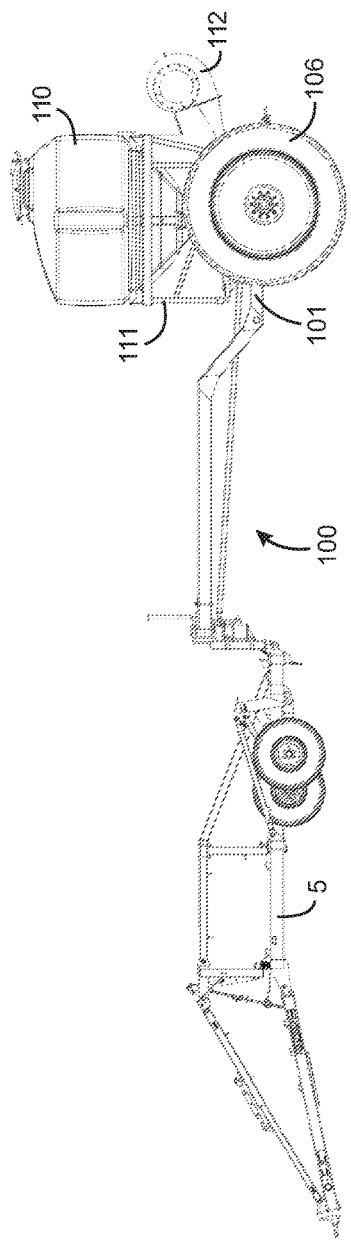
FIG. 2 depicts a side view of the trailer depicted in FIG. 1A with a seed bin mounted on the trailer.
Figure 3:
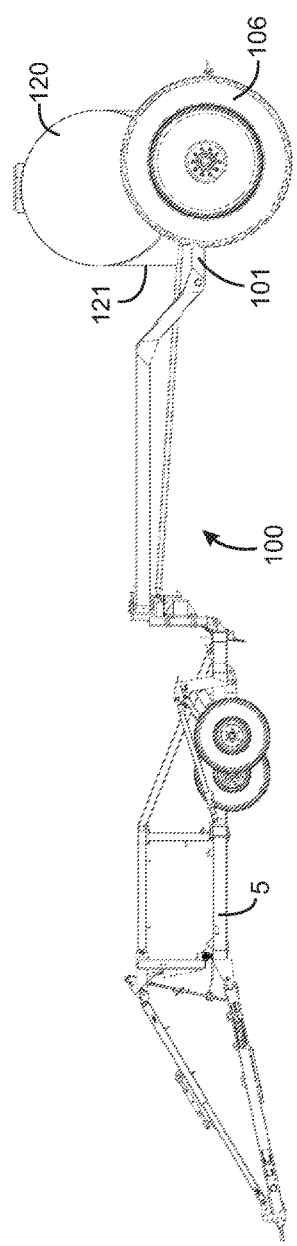
FIG. 3 depicts a side view of the trailer depicted in FIG. 1A with a liquid product tank mounted on the trailer.
Figure 4:
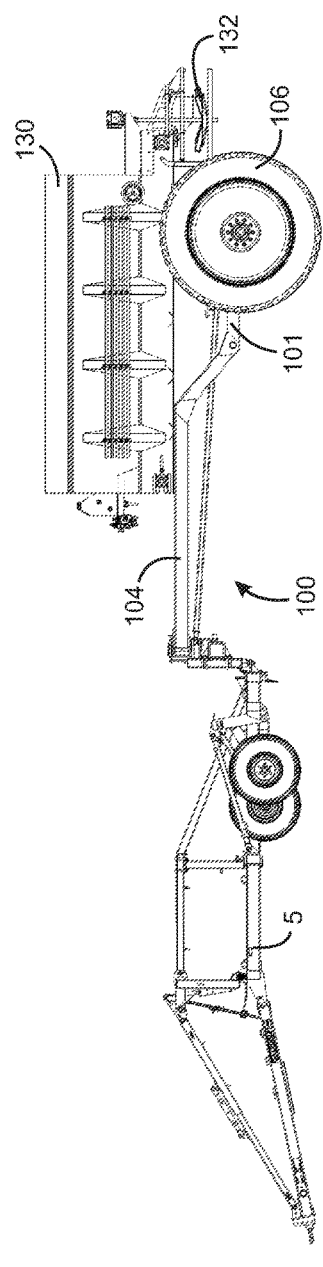
FIG. 4 depicts a side view of the trailer depicted in FIG. 1A with a spinner spreader box mounted on the trailer.

The trailer 100 may be interchangeably equipped with a variety of containers as shown in FIG. 2 to FIG. 5. FIG. 2 shows the trailer 100 outfitted with a seed bin 110. The seed bin 110 is secured in a superstructure 111 designed to contain the seed bin 110 and to permit mounting of the superstructure 111 on the frame 101 of the trailer 100. The seed bin 110 is accompanied by an air blower 112, which is part of an air delivery system for delivering seed to seed applicators located on the agricultural implement 5. Air lines which deliver the seed are not shown. FIG. 3 shows the trailer 100 outfitted with a liquid tank 120. The liquid tank 120 is contained in a superstructure 121 configured to be mounted on the frame 101 of the trailer 100. Liquid lines in fluid communication with the liquid in the liquid tank 120 are not shown. FIG. 4 shows the trailer 100 outfitted with a spinner spreader box 130. The spinner spreader box 130 is mounted on the frame 101 and tongue 104 of the trailer 100. The spinner spreader box 130 is associated with a spinner spreader 132, which delivers granular product contained in the box 130 to the environment. FIG. 5A and FIG. 5B show the trailer 100 outfitted with a granular fertilizer bin 140. The granular fertilizer bin 140 is contained on a superstructure 141 configured to be mounted on the frame 101 of the trailer 100. As seen in FIG. 5B, air booms 142 associated with the granular fertilizer bin 140 may be configured to deliver granular fertilizer from the bin 140 to the environment.

FIG. 6A and FIG. 6B show the frame 101 of the trailer to further illustrate a three-point mount for supporting containers on the trailer and facilitating the interchange of containers. Each of the longitudinally oriented rectangular tubes 102 and the transversely oriented rectangular tube 103 of the frame 101 comprises a mounting tab 145 through which mounting apertures 146 are formed (only one of two mounting apertures 146 is labeled on each mounting tab 145). The mounting tabs 145 are fixedly secured to the rectangular tubes 102, 103, for example by welding, and the mounting apertures 146 are configured to receive downwardly depending pins or bolts attached to the container or the superstructure for the container. The mounting tabs 145 on the longitudinally oriented rectangular tubes 102 may be located at or proximate to the rear end of the tubes 102, while the mounting tab 145 on the transversely oriented rectangular tube 103 may be conveniently located proximate a transversely central point to provide an approximately isosceles triangular three-point mount for the containers. The locations of the mounting apertures 146 and the pins or bolts on the container or superstructure are preferably selected so that the center of gravity of the container is over the axle bar 105.

Further, having more than one mounting aperture 146 per mounting tab 145 simplifies and provides flexibility in mounting the container on the frame 101. While two mounting apertures 146 are shown, more than two apertures in any suitable pattern on the mounting tab 145 may be provided. The container may be mounted on the trailer with the aid of a mounting rack or a forklift, and guide structures may be associated with the mounting apertures 146 to guide the pins or bolts toward the mounting apertures 146 as the container is being mounted on the frame 101. The pins or bolts may be secured in the mounting apertures 146 by any suitable device, for example cotter pins, nuts and the like.

Figure 7:
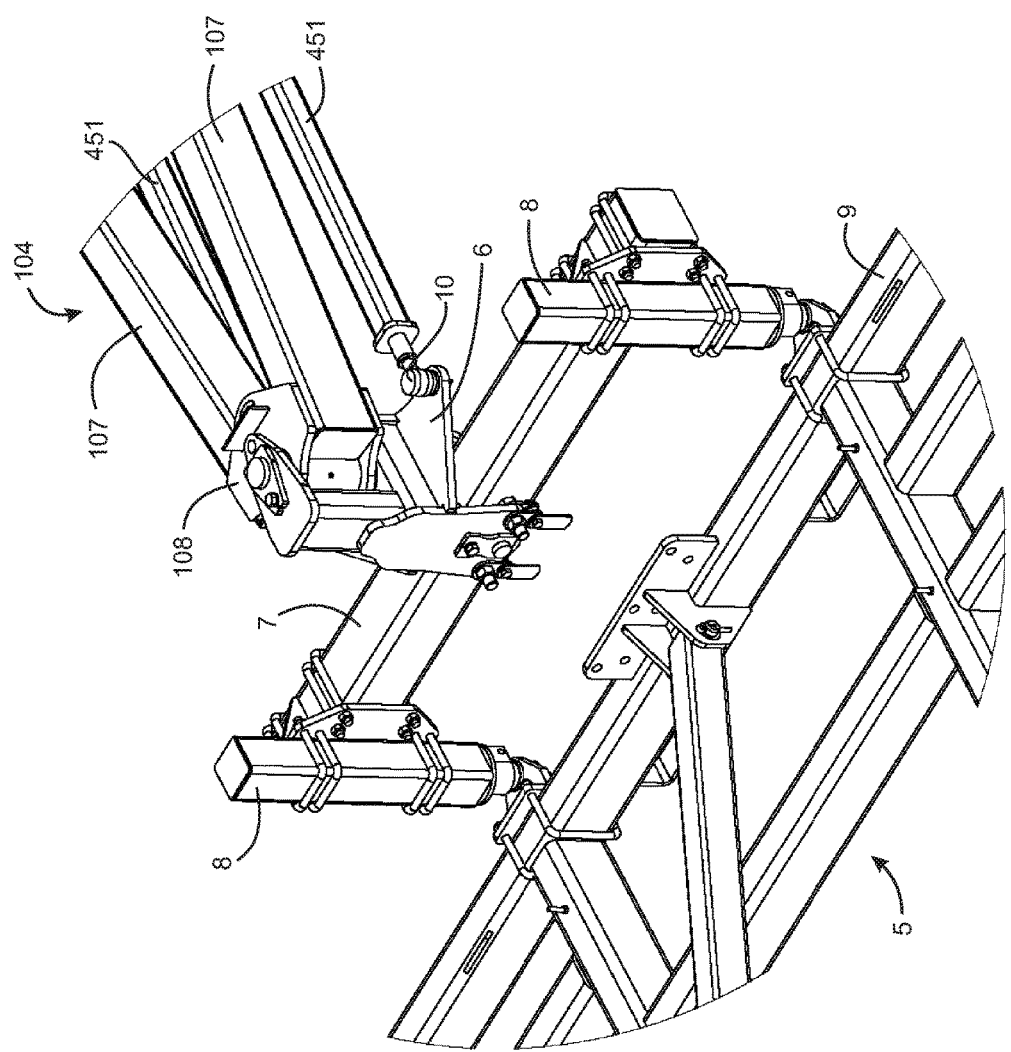
FIG. 7 depicts a plan view illustrating how a tongue of the trailer depicted in FIG. 1A is hitched to an implement.

FIG. 7 provides a magnified view of how the tongue 104 of the trailer is hitched to the implement 5. The hitch 108 at the front ends of the converging longitudinally oriented rectangular tubes 107 comprises to ball receivers for receiving two hitch balls protruding upwardly form hitch plate 6 mounted on hitch tube 7, where hitch tube 7 is removably mounted on two hitch struts 8 using brackets, which is in turn removably mounted on a rear bar 9 of implement 5 also using brackets. As discussed in more detail below, if the trailer in one embodiment comprises a 5-bar steering mechanism, control rods 451 of the steering mechanism may be pivotally mounted at pivot mount 10 on hitch plate 6 so that turning of the implement 5 will either cause the control rods 451 to translate longitudinally rearward or forward depending on whether the implement is turning left or right.

As shown in FIG. 8A and FIG. 8B, in one embodiment, transverse distance between opposed wheels 206a, 206b of a trailer 200 may be adjustable. In FIG. 8A where the wheels 206a, 206b are separated by a shorter transverse distance, opposed stub axles 211a, 211b are removably mounted directly on opposed ends of a transverse axle bar 205. To increase the transverse distance between the wheels 206a, 206b, the stub axles 211a, 211b may be dismounted from the axle bar 205 and axle inserts 212a, 212b may be inserted between respective stub axles 211a, 211b and the axle bar 205, as depicted in FIG. 8B. The axle inserts 212a, 212b may have the same length to extend the distance from the axle bar 205 to the stub axles 211a, 211b by the same amount, but in some applications it may be desirable for the axle inserts 212a, 212b to have different lengths. In some applications it may be desirable to insert an axle insert on one side of the trailer but not on the other side. Axle inserts of different lengths may be provided to be able to adjust the transverse distance between the opposed wheels by different amounts. In some embodiments, the axle inserts may be length adjustable actuators (e.g. hydraulic cylinders or linear actuators) so that the transverse distance between opposed wheels may be finely and/or independently controlled without the need to dismount the stub axles from the axle bar.

FIG. 9A and FIG. 9B show magnified views of one embodiment of an extended axle and wheel arrangement on one side of the trailer 200. The other side of the trailer 200 may comprise a similar arrangement. In the extended arrangement depicted in FIG. 9A and FIG. 9B, the axle bar 205 is rigidly connected to the stub axle 211a though the axle insert 212a. An axle bar mounting plate 221a may be rigidly attached to an end of the axle bar 205, for example by welding or being formed integrally with the axle bar 205, and the axle bar mounting plate 221a may be removably mounted to a first insert mounting plate 222a, for example by bolting through bolt holes 241, 242, 243 in the axle bar mounting plate 221a and bolt holes 244, 245, 246 in the first insert mounting plate 222a. The first insert mounting plate 222a may be rigidly attached to a first end of the axle insert 212a, for example by welding or being formed integrally with the axle insert 212a. A second end of the axle insert 212a may comprise a second insert mounting plate 223a, which may also be rigidly attached the axle insert 212a. The second insert mounting plate 223a may be removably attached, for example by bolting, to a stub axle mounting plate 224a, which may be part of a stub axle assembly 225a. Bolting of the second insert mounting plate 223a to the stub axle mounting plate 224a may be accomplished by bolting through bolt holes 247, 248, 249, 250, 251 in the second insert mounting plate 223a and bolt holes 252, 253, 254 in the stub axle mounting plate 224a.

In this embodiment, to change the distance between the wheels, the axle insert 212a may be removed by unbolting the stub axle mounting plate 224a from the second insert mounting plate 223a and then unbolting the first insert mounting plate 222a from the axle bar mounting plate 221a. The stub axle mounting plate 224a may then be bolted directly to the axle bar mounting plate 221a, or an axle insert of different length may be bolted between the axle bar mounting plate 221a and the stub axle mounting plate 224a.

In addition to the stub axle mounting plate 224a, stub axle assembly 225a may comprise the stub axle 211a housed and secured in axle collar 226a by a bolt 227a. The axle collar 226a may be supported in apertures in collar support brackets 228a and the bolt 227a may further serve to prevent the axle collar 226a from slipping out of the collar support brackets 228a. The collar support brackets 228a may be rigidly fixed to the stub axle assembly 225a, or in the case where the trailer 200 comprises a steering mechanism, the collar support brackets 228a may be mounted on a rotatable spindle 229a rotatably mounted on the stub axle assembly 225a. The rotatable spindle 229a may be connected to the steering mechanism to permit turning the wheel 206a, for example by connecting a tie rod to rotatable spindle 229a. The wheel 206a may be removably mounted on a wheel hub 231a, which may be mounted on the stub axle 211a in any usual way, preferably with the use of bearings in the wheel hub 231a to permit easy rotation of the wheel hub 231a on the stub axle 211a.

Figure 10B:
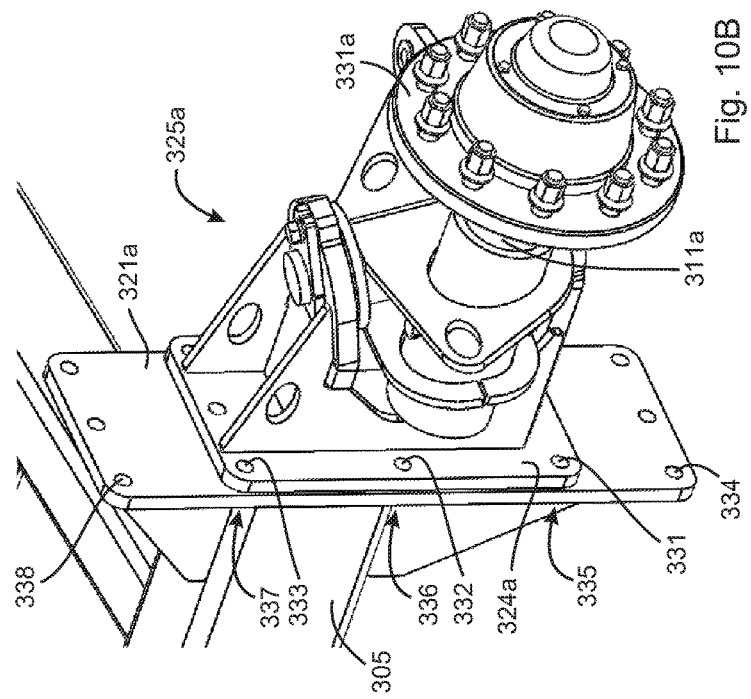
FIG. 10B depicts a magnified orthogonal view of a region B of the axle illustrated in FIG. 10A.
Figure 10A:
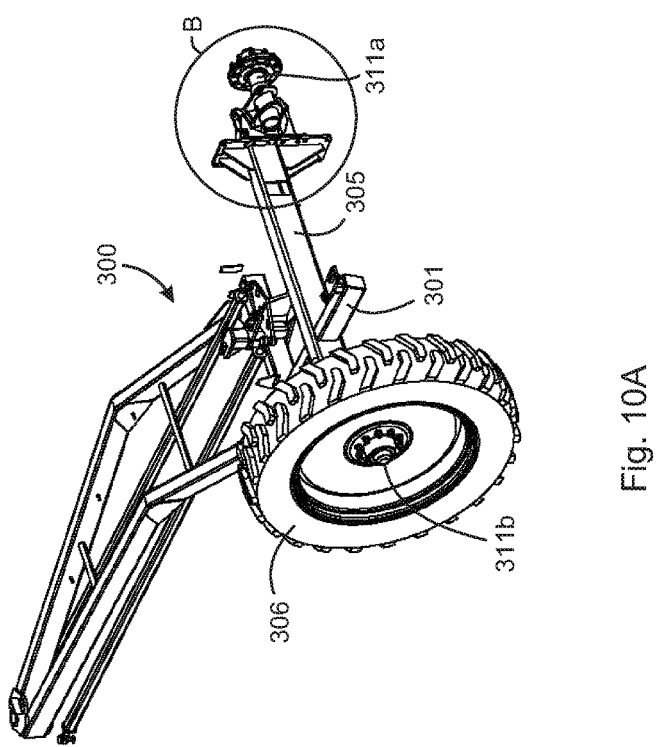
FIG. 10A depicts a rear isometric view of a trailer having one wheel removed to illustrate where a height of the trailer frame in relation to the ground may be adjustable at an axle.

FIG. 10A, FIG. 10B, FIG. 11A and FIG. 11B illustrates one embodiment of a trailer 300 in which a height of a frame 301 above the ground may be adjusted. Adjustment of the height in this embodiment may be accomplished by changing the relative heights of stub axles 311a, 311b to an axle bar 305 on the trailer 300. While the stub axles 311a, 311b and wheels 306 remain at the same height, the axle bar 305 and the frame 301 of which the axle bar 305 is a part may be raised or lowered in relation to the stub axles 311a, 311b. Details of how height adjustment in this embodiment may be accomplished are best illustrated in FIG. 10B. FIG. 10B illustrates an axle arrangement on one side of the trailer 300, but the other side of the trailer 300 may comprise a similar arrangement.

Figure 11A:
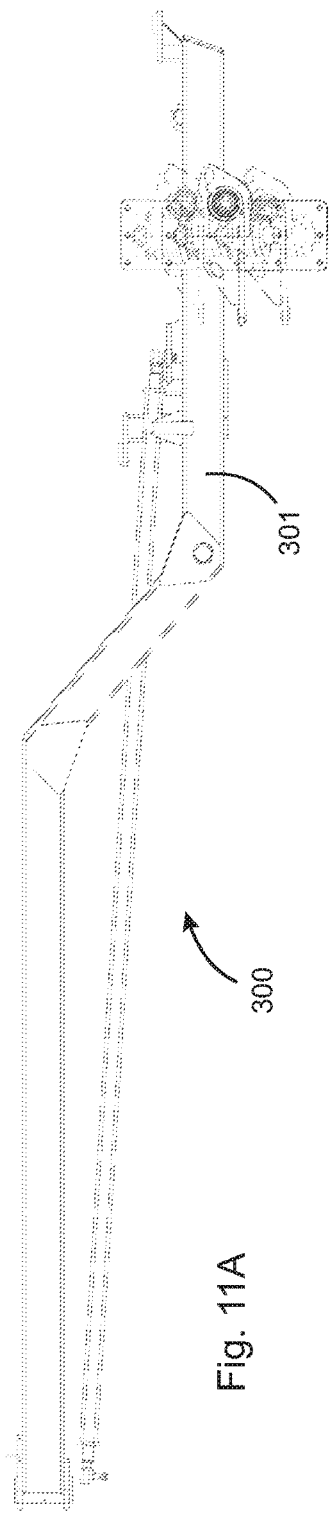
FIG. 11A depicts a side view of the trailer of FIG. 10A showing three positions to which the height of the frame may be adjusted in relation to the ground.
Figure 11B:
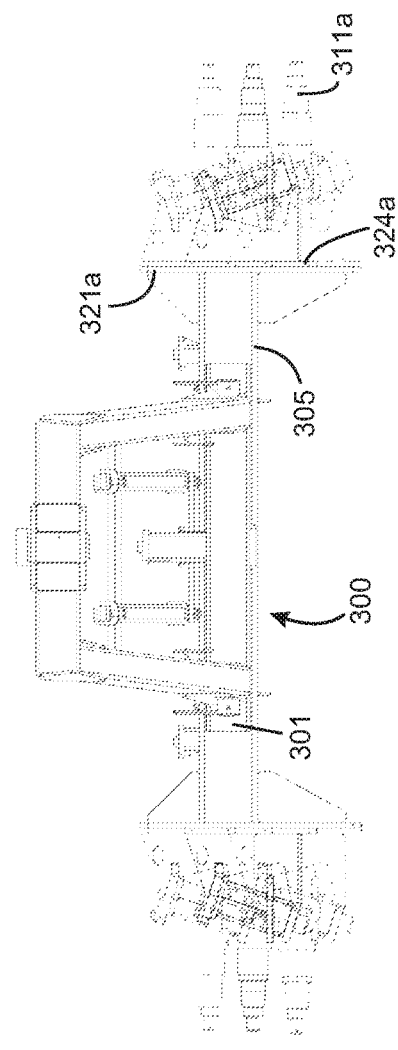
FIG. 11B depicts a rear view of the trailer of FIG. 10A showing three positions to which the height of the frame may be adjusted in relation to the ground.

With reference to FIG. 10B, the stub axle 311a may be mounted in a stub axle assembly 325a, and a wheel removably mounted on a wheel hub 331a rotatably mounted on the stub axle 311a. The stub axle assembly 325a may further comprise a stub axle mounting plate 324a, the stub axle mounting plate 324a comprising a plurality of bolt holes arranged in rows 331, 332, 333. Three rows of bolt holes 331, 332, 333 are labeled and each row comprises three bolt holes. More or fewer rows of bolt holes and/or bolt holes per row may be used if desired, but at least two rows of bolt holes and two bolt holes per row are generally desirable. The stub axle mounting plate 324a may be mounted on the axle bar 305 at an axle bar mounting plate 321a. The axle bar mounting plate 321a may also comprise a plurality of bolt holes arranged in rows 334, 335, 336, 337, 338. Five rows of bolt holes 334, 335, 336, 337, 338 are labeled and each row comprises three bolt holes, although the rows of bolt holes 335, 336, 337 are not seen in FIG. 10B as they are hidden behind the stub axle mounting plate 324a. More or fewer rows of bolt holes and/or bolt holes per row may be used if desired, but at least two bolt holes per row is generally desirable for security and the number of rows of bolt holes depends on the number of height settings that are desired. In FIG. 10B, five rows of bolt holes 334, 335, 336, 337, 338 on the axle bar mounting plate 321a and three rows of bolt holes on the stub axle mounting plate 324a provides for at least three height settings, although another two height settings for a total of five height settings are possible if only two rows of bolt holes are used to secure the stub axle mounting plate 324a to the axle bar mounting plate 321a. FIG. 11A and FIG. 11B illustrate three height settings achievable by the height adjustable axle arrangement depicted in FIG. 10B.

Securing of the two mounting plates 324a, 321a together may be accomplished by aligning the rows of bolt holes, inserting bolts through the aligned bolt holes and then using nuts to secure the bolts in the bolt holes. FIG. 10B illustrates an intermediate height setting where the rows of bolt holes 331, 332, 333 in the stub axle mounting plate 324a are aligned with the rows of bolt holes 335, 336, 337 in the axle bar mounting plate 321a. The axle bar 305, and thus the frame of the trailer, may be raised in relation to the ground by bolting the rows of bolt holes 331, 332, 333 in the stub axle mounting plate 324a to higher rows of bolt holes 336, 337, 338 in the axle bar mounting plate 321a. The axle bar 305, and thus the frame of the trailer, may be lowered in relation to the ground by bolting the rows of bolt holes 331, 332, 333 in the stub axle mounting plate 324a to lower rows of bolt holes 334, 335, 336 in the axle bar mounting plate 321a. Spacing between the rows of bolt holes in the stub axle mounting plate and between the rows of bolt holes in the axle bar mounting plate, as well as spacing between the individual bolt holes in the rows may be regularized to ensure that the bolt holes between the two mounting plates readily align at all desired height settings. While this embodiment has been described with reference to bolts and bolt holes, other structures may be used to mount the axle bar 305 at different heights in relation to the stub axle 311a, for example clamps, unthreaded pins, and the like.

Comparing FIG. 10B to FIG. 9A it is evident that the same structures used for mounting the stub axles on the axle bar may facilitate both height adjustment (FIG. 10B) and adjustment of the transverse distance between the wheels (FIG. 9A, 'width' adjustment). In a trailer that combines both height and width adjustment, the axle bar mounting plate and the first and second insert mounting plates may be the same in size and bolt hole configuration so that the stub axle mounting plate may be mounted at a desired height setting whether or not an axle insert is employed. Further, the stub axle assembly may be the same whether or not height and/or width adjustment is desired. Thus, the description related to the structure of the stub axle assembly in FIG. 9A is equally applicable to the stub axle assembly in FIG. 10B.

A trailer 400 having a steering mechanism 450 for the wheels 406a, 406b is depicted in FIG. 12A, FIG. 12B, FIG. 13A, FIG. 13B, FIG. 13C, FIG. 14A, FIG. 14B, FIG. 15A, FIG. 15B, FIG. 16A and FIG. 16B. The trailer 400 comprises a frame 401, a tongue 404 a hitch 408 at a forward end of the tongue 404 for hitching to an agricultural implement, an axle bar 405 which is part of the frame 401, first and second stub axle assemblies 425a, 425b removably mounted on the axle bar 405 and comprising stub axles 411a, 411b, and wheel hubs 431a, 431b rotatably mounted on the stub axles 411a, 411b and adapted to receive the wheels 406a, 406b. The stub axle assemblies 425a, 425b are the same as the stub axle assembly described in connection with FIG. 9A. In FIG. 12B, transverse distance between the wheels is increased by the insertion of two axle inserts 412a, 412b between the axle bar 405 and respective stub axle assemblies 425a, 425b in a manner as previously described.

The steering mechanism 450 may comprise five 'bars' linked into a pentagon at five locations and controlled by one or more control rods 451. The one or more control rods 451 may extend longitudinally between a pivot plate 455 proximate a rear of the trailer 400 and the hitch plate 6 mounted on the hitch tube 7 of the transportation or implement towing the trailer 400. The one or more control rods 451 may be pivotally mounted on the pivot plate 455 at one or more control rod pivot points 452, and may be pivotally mounted on the hitch plate 6 at one or more pivot mounts 10.

The 'bars' of the 5-bar mechanism may comprise a first tie rod 456a, a second tie rod 456b, a first stub axle linkage 457a, a second stub axle linkage 457b and a 'bar' comprising the axle bar 405, stub axle assemblies 425a, 425b and any axle inserts 412a, 412b when taken all together may be considered a single rigid 'bar' in the 5-bar mechanism. The first tie rod 456a and second tie rod 456b are pivotally linked together at pivot points 454 on the pivot plate 455. The first tie rod 456a is pivotally linked to the first stub axle linkage 457a at a pivot point 458a. The second tie rod 456b is pivotally linked to the second stub axle linkage 457b at a pivot point 458b. The first stub axle linkage 457a is pivotally connected to the first stub axle assembly 425a at a first spindle 429a. The second stub axle linkage 457b is pivotally connected to the second stub axle assembly 425b at a second spindle 429b.

Figure 13C:
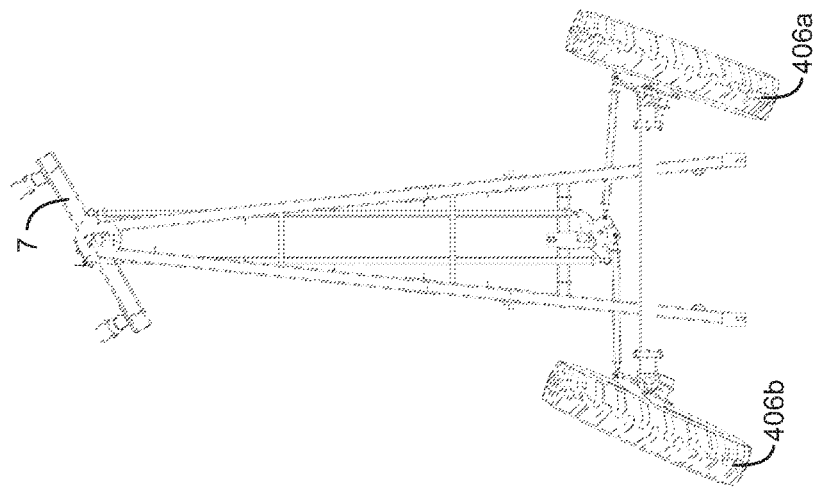
FIG. 13C depicts a plan view of the trailer of FIG. 12A in a thirty degree turn.
Figure 13B:
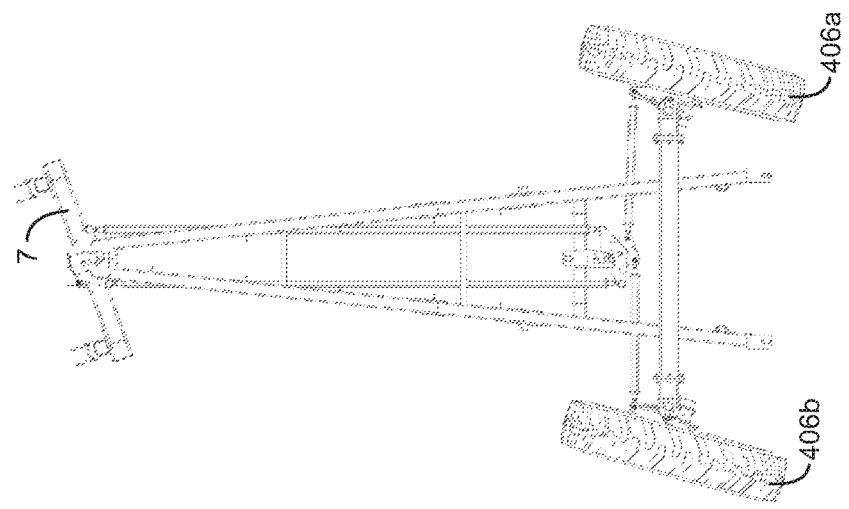
FIG. 13B depicts a plan view of the trailer of FIG. 12A in a twenty degree turn.
Figure 13A:
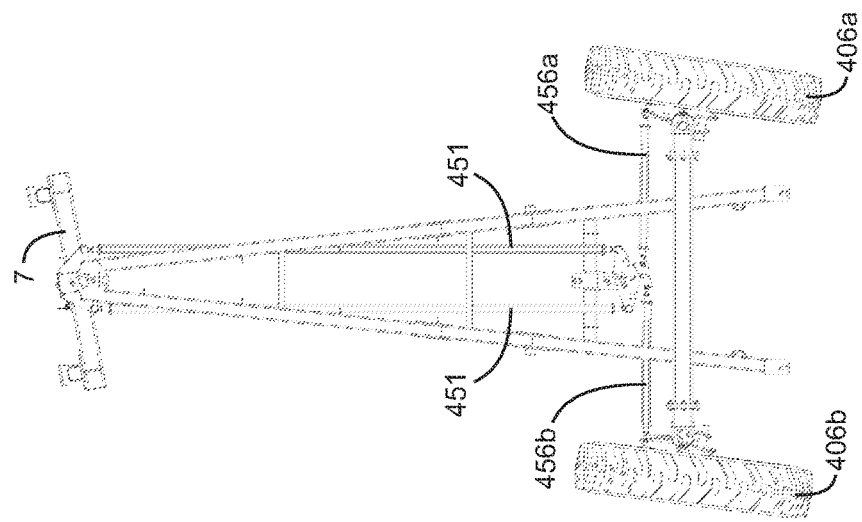
FIG. 13A depicts a plan view of the trailer of FIG. 12A in a ten degree turn.
Figure 14B:
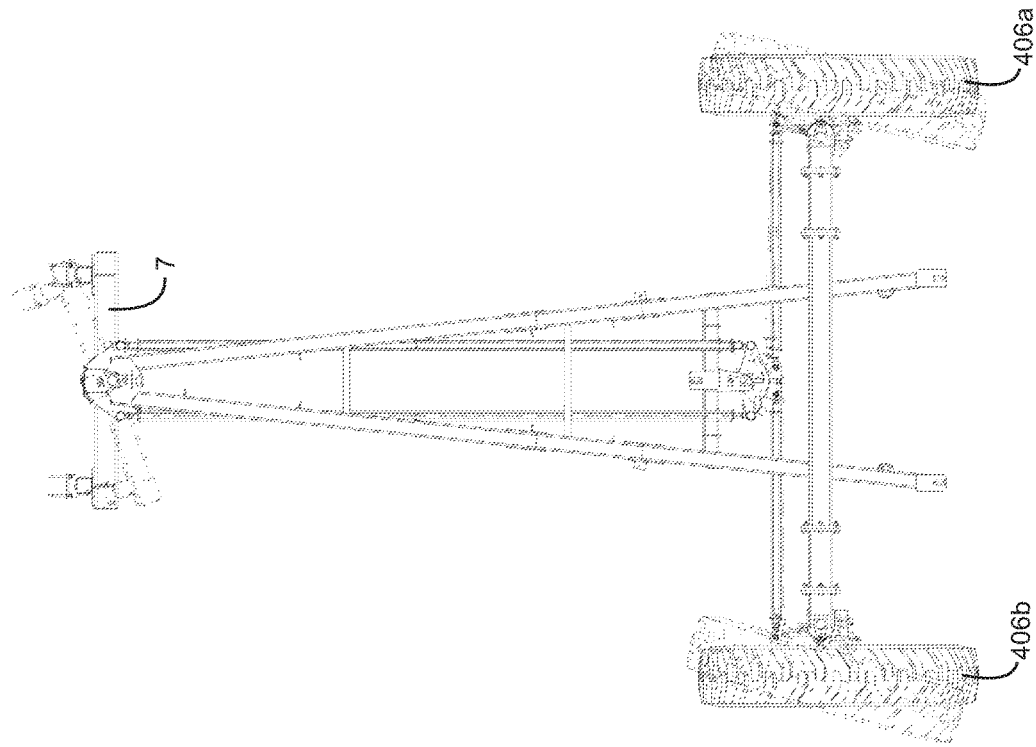
FIG. 14B depicts a plan view of an overlay of the trailer of FIG. 12B when the trailer is tracking straight (solid lines) in comparison to when the trailer is turning (dashed lines).
Figure 14A:
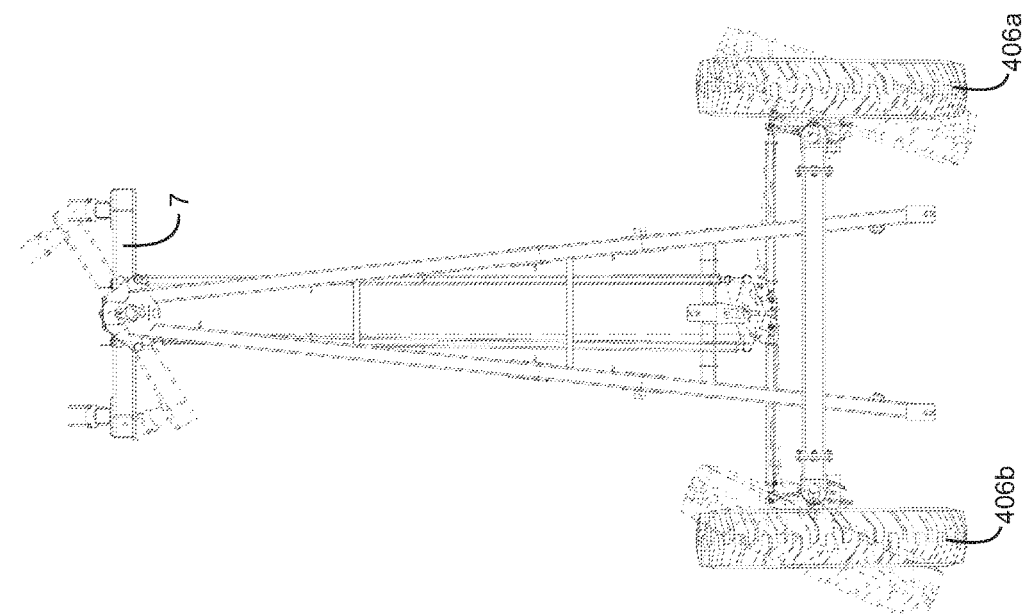
FIG. 14A depicts a plan view of an overlay of the trailer of FIG. 12A when the trailer is tracking straight (solid lines) in comparison to when the trailer is turning (dashed lines).
Figure 15B:
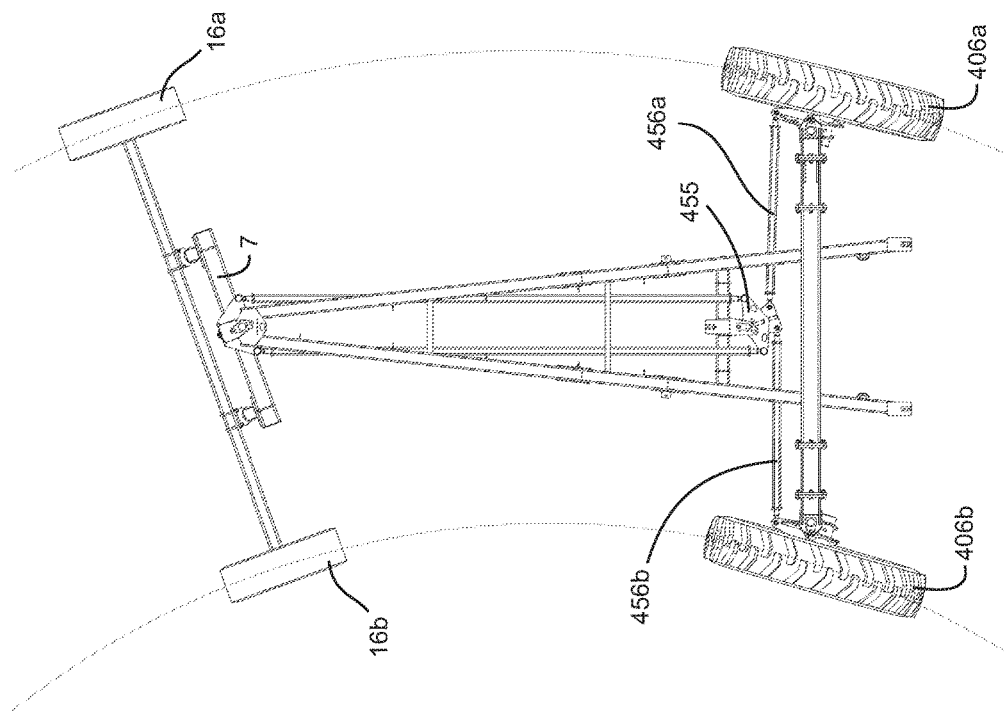
FIG. 15B depicts a plan view of the trailer of FIG. 12B hitched to transportation having a wider wheel base while in a turn showing how the wheels of the trailer track with respect to the wheels of the transportation.
Figure 15A:
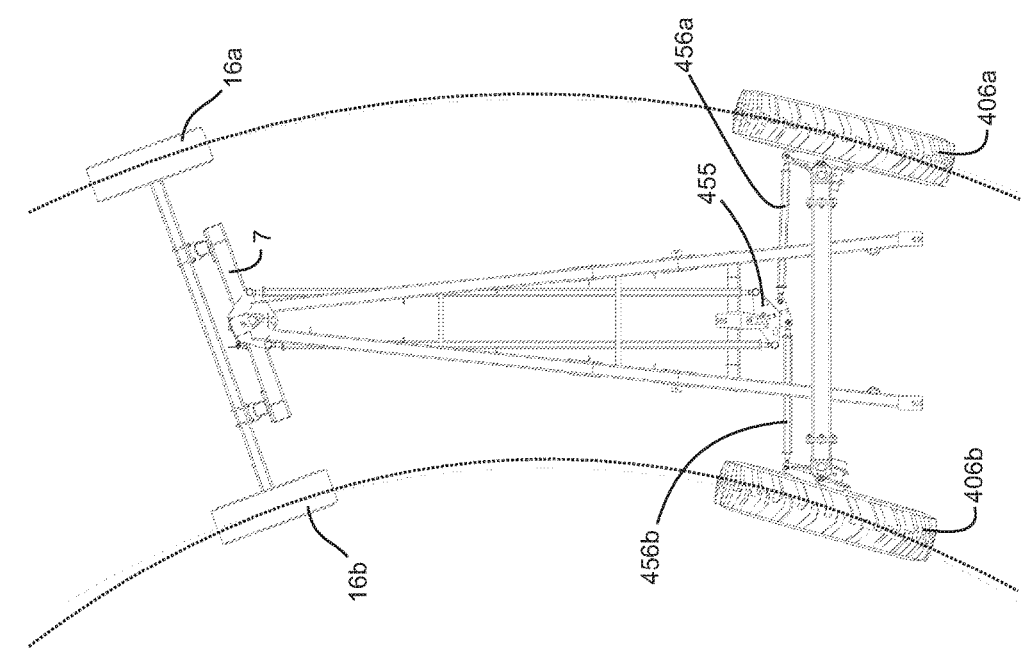
FIG. 15A depicts a plan view of the trailer of FIG. 12A hitched to transportation while in a turn showing how the wheels of the trailer track with respect to the wheels of the transportation.

With reference to FIG. 12A, FIG. 12B, FIG. 13A, FIG. 13B, FIG. 13C, FIG. 14A, FIG. 14B, FIG. 15A, FIG. 15B, FIG. 16A and FIG. 16B, operation of the steering mechanism 450 is as follows. When the implement is turning, hitch tube 7 on the implement acquires a non-orthogonal angle with the longitudinal axis of the trailer 400 causing the one or more control rods 451 to translate longitudinally. Longitudinal translation of the one or more control rods 451 is towards the rear of the trailer 400 for control rods 451 disposed to an inside of the turn with respect to a central longitudinal axis of the trailer, and is towards the front of the trailer 400 for control rods 451 disposed to an outside of the turn with respect to a central longitudinal axis of the trailer 400. Translation of the one or more control rods 451 causes the pivot plate 455 to pivot about a vertical axis through the pivot plate 455. Pivoting of the pivot plate 455 causes the tie rods 456a, 456b to translate transversely and somewhat longitudinally while pivoting about the pivot points 454 on the pivot plate 455. Transverse translation of the tie rods 456a, 456b causes the stub axle linkages 457a, 457b to translate arcuately about vertical axes though spindles 429a, 429b thereby rotating the spindles 429a, 429b. As described in connection with FIG. 9A, the spindles 429a, 429b are ultimately connected to the stub axles 411a, 411b, therefore rotation of the spindles 429a, 429b causes the stub axles 411a, 411b and the wheels 406a, 406b thereon to turn in a direction opposite the turning of the hitch tube 7, as best illustrated in FIG. 13A, FIG. 13B and FIG. 13C. Because the stub axle assemblies 425a, 425b and any axle inserts 412a, 412b are rigidly connected to the axle bar 405, which is a part of the frame 401 of the trailer 400, rotation of the spindles 429a, 429b must cause turning of the wheels 406a, 406b as the trailer 400 itself is much more difficult to move and acts essentially as a weight against which the rotating action of the spindles 429a, 429b can effect turning of the stub axles 411a, 411b and the wheels 406a, 406b.

The steering mechanism 450 described herein is easily adaptable to configurations of the trailer 400 having an increased transverse distance between the wheels 406a, 406b. As illustrated in FIG. 13B, the transverse distance between the wheels may be increased by inserting two axle inserts 412a, 412b between the axle bar 405 and respective stub axle assemblies 425a, 425b in a manner as previously described. To accommodate the effective increase in length of the axle, the length of the tie rods 456a, 456b may also be increased. Lengthening the tie rods may be accomplished by replacing the tie rods, by using hydraulic or linear actuators, or by using length adjustable tie rods, for example telescoping rods based on a threaded rod-in-tube arrangement. Stub axle linkages 457a, 457b remain a fixed length. Effective lengthening of the axle may also cause the pivot plate 455 to translate longitudinally in its position. Adjusting the length of the one or more control rods 451 may be required to accommodate translation of the pivot plate 455. Adjusting the length of the one or more control rods 451 may be accomplished by replacing the control rods, by using hydraulic or linear actuators, or by using length adjustable control rods, for example telescoping rods based on a threaded rod-in-tube arrangement.

Changing the transverse distance between the trailer wheels is important for keeping the wheels between crop rows when crop row spacing changes and the transportation or implement has wheels that are spaced for the new spacing of the crop rows. In prior art steerable trailers, changing the effective length of the axle prevents the steering mechanism from properly tracking the trailer's wheels behind the wheels of the transportation or towing implement while the trailer is turning. Instead of properly and smoothly tracking behind the transportation's or implement's wheels, the wheels of the trailer tend to skid sideways in turns. Such behavior may arise from the way the steering linkages and pivot points are arranged in relation to the effective lengthening of the axle. With the steering mechanism 450 described herein, effective lengthening of the axle on one side of the trailer 400 occurs between the pivot points 458a and 454 in the 5-bar mechanism and on the other side occurs between the pivot points 458b and 454 in the 5-bar mechanism. As illustrated in FIG. 15A, FIG. 15B, FIG. 16A and FIG. 16B, the existence and generally central location of the pivot plate 455 permits adjusting the lengths of the tie rods 456a, 456b when the effective axle length is increased while maintaining the ability of the trailer wheels 406a, 406b to track properly behind wheels 16a, 16b of the transportation, even when only one control rod 451 is used in the steering mechanism 450 (see FIG. 16A and FIG. 16B).

The trailer 400 may be readily convertible between a steerable trailer and a non-steerable trailer in a number of ways, for example by disconnecting the one or more control rods 451 from the pivot mounts 10 and reconnecting the one or more control rods 451 to a rigid portion of the trailer 400 (e.g. the tongue 404) to prevent the pivot plate 455 from pivoting, by disconnecting the one or more control rods 451 from the pivot plate 455 and securing the pivot plate 455 (e.g. to the frame 401) so that the pivot plate 455 cannot pivot, or by disconnecting the tie rods 456a, 456b from the pivot plate 455 and reconnecting the tie rods 456a, 456b to a non-movable portion of the trailer 400 (e.g. the frame 401).

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A steerable trailer comprising:
   a frame having frame-members for supporting a container;
   at least a pair of opposed traction devices having an adjustable transverse distance therebetween rotatably mounted on stub axles mounted on a transverse axle bar mounted on the frame, the transverse axle bar having an adjustable height in relation to the ground;
   a tongue pivotally mountable on a hitch tube of a transportation device or an implement being towed by a transportation device; and,
   a steering mechanism for the traction devices, the steering mechanism comprising a 5-bar linkage assembly in which five linkage arms are connected at pivot points so that the five linkage arms are movable relative to each other, one of the linkage arms comprising the transverse axle bar and three of the five linkage arms, including the axle bar, being length adjustable,
   the trailer further comprising stub axle assemblies, axle bar mounting plates and at least one axle insert,
   each stub axle assembly comprising the stub axle and a stub axle mounting plate, the stub axle mounting plate comprising a first plurality of vertically separated connection structures,
   the axle bar mounting plates situated proximate opposed ends of the transverse axle bar, each axle bar mounting plate comprising a second plurality of vertically separated connection structures, at least one of the vertically separated connection structures of the second plurality of connection structures alignable with and securable to any one of the first plurality of connection structures for mounting the axle bar at different heights with respect to the stub axle and the ground,
   the at least one axle insert comprising
      a first insert mounting plate, the first insert mounting plate comprising at least one connection structure alignable with at least one of the connection structures of the second plurality of connection structures for mounting the axle insert on the transverse axle bar, and
      a second insert mounting plate, the second insert mounting plate comprising a third plurality of vertically separated connection structures, at least one of the vertically separated connection structures of the third plurality of connection structures alignable with and securable to any one of the first plurality of connection structures for mounting the axle insert at different heights with respect to the stub axle and the ground.

2. The trailer of claim 1, wherein the at least one connection structure of the first insert mounting plate comprises a fourth plurality of vertically separated connection structures, the connection structures of the fourth plurality of connection structures alignable with and securable to the second plurality of connection structures.

3. The trailer of claim 1, wherein the at least one axle insert is two axle inserts.

4. The trailer of claim 3, wherein the connection structures are bolt holes, and wherein securing is accomplished with bolts through the bolt holes.

5. The trailer according to claim 1, wherein the traction devices comprise wheels.

6. A steerable trailer comprising:
   a frame having frame-members for supporting a container;
   at least a pair of opposed traction devices having an adjustable transverse distance therebetween rotatably mounted on stub axles mounted on a transverse axle bar mounted on the frame, the transverse axle bar having an adjustable height in relation to the ground;
   a tongue pivotally mountable on a hitch tube of a transportation device or an implement being towed by a transportation device; and,
   a steering mechanism for the traction devices, the steering mechanism comprising a 5-bar linkage assembly in which five linkage arms are connected at pivot points so that the five linkage arms are movable relative to each other, one of the linkage arms comprising the transverse axle bar and three of the five linkage arms, including the axle bar, being length adjustable,
   the trailer further comprising stub axle assemblies, axle bar mounting plates and at least one axle insert,
   each stub axle assembly comprising the stub axle and a stub axle mounting plate, the stub axle mounting plate comprising a first plurality of vertically separated connection structures,
   the axle bar mounting plates situated proximate opposed ends of the transverse axle bar, each axle bar mounting plate comprising a second plurality of vertically separated connection structures, at least one of the vertically separated connection structures of the second plurality of connection structures alignable with and securable to any one of the first plurality of connection structures for mounting the axle bar at different heights with respect to the stub axle and the ground,
   the at least one axle insert comprising
      a first insert mounting plate, the first insert mounting plate comprising at least one connection structure alignable with at least one of the connection structures of the second plurality of connection structures for mounting the axle insert on the transverse axle bar, and
      a second insert mounting plate, the second insert mounting plate comprising a third plurality of vertically separated connection structures, at least one of the vertically separated connection structures of the third plurality of connection structures alignable with and securable to any one of the first plurality of connection structures for mounting the axle insert at different heights with respect to the stub axle and the ground.

7. The trailer according to claim 6, wherein the axle bar comprises one or more disconnectable connection points into and out of which one or more spacers are insertable or removable to lengthen or shorten the axle bar to adjust the transverse distance between the opposed traction devices.

8. The trailer according to claim 6, wherein the axle bar is rigidly mounted on the frame, and the stub axles are mountable at different vertically-spaced locations on axle bar mounting plates proximate each end of the axle bar.

9. The trailer according to claim 8, wherein the axle bar comprises one or more disconnectable connection points into and out of which one or more spacers are insertable or removable to lengthen or shorten the axle bar to adjust the transverse distance between the opposed traction devices.

10. The trailer according to claim 9, further comprising stub axle assemblies, the stub axle assemblies comprising the stub axles and stub axle mounting plates, wherein the stub axle mounting plates are mountable at different vertically-spaced locations on the axle bar mounting plates or mounting plates of the one or more spacers.

11. The trailer according to claim 6, wherein the traction devices comprise wheels.

\* \* \* \* \*